(12) United States Patent
Neuhaus

(10) Patent No.: US 11,569,515 B2
(45) Date of Patent: Jan. 31, 2023

(54) CAVERN BATTERY BANK

(71) Applicants: WESTENERGIE AG, Essen (DE); RWE GAS STORAGE WEST GMBH, Essen (DE)

(72) Inventor: Guido Neuhaus, Duelmen (DE)

(73) Assignees: WESTENERGIE AG, Essen (DE); RWE GAS STORAGE WEST GMBH, Essen (DE)

(*) Notice: Subject to any disclaimer, the term of this patent is extended or adjusted under 35 U.S.C. 154(b) by 0 days.

(21) Appl. No.: 17/444,713

(22) Filed: Aug. 9, 2021

(65) Prior Publication Data

US 2022/0037683 A1  Feb. 3, 2022

Related U.S. Application Data

(63) Continuation of application No. 16/315,840, filed as application No. PCT/EP2017/067123 on Jul. 7, 2017, now Pat. No. 11,088,374.

(30) Foreign Application Priority Data

Jul. 7, 2016  (DE) ...................... 10 2016 212 390.4

(51) Int. Cl.
*H01M 8/0289* (2016.01)
*H01M 8/18* (2006.01)
*H01M 8/20* (2006.01)

(52) U.S. Cl.
CPC ......... *H01M 8/0289* (2013.01); *H01M 8/188* (2013.01); *H01M 8/20* (2013.01); *Y02E 60/50* (2013.01)

(58) Field of Classification Search
CPC ..................................................... H01M 8/188
See application file for complete search history.

(56) References Cited

U.S. PATENT DOCUMENTS 9,905,876 B2  2/2018  Schubert et al.
2009/0311559 A1  12/2009  Levine et al.

FOREIGN PATENT DOCUMENTS

| DE | 102012016317 | 2/2014 |
| DE | 102013225159 | 6/2015 |
| DE | 102014225190 | 6/2016 |
| JP | 2003-331903 | 11/2003 |
| WO | 2009/040521 | 4/2009 |

OTHER PUBLICATIONS

Janoschka et al., "An aqueous, polymer-based redox-flow battery using non-corrosive, safe, and low-cost materials", Nature, vol. 527, No. 7576, Oct. 21, 2015, pp. 78-81, Germany.
English translation of International Search Report from corresponding PCT Appln No. PCT/EP2017/067123, dated Aug. 23, 2017.
English translation of International Preliminary Report on Patentability from corresponding PCT Appln No. PCT/EP2017/067123, dated Aug. 23, 2017.

*Primary Examiner* — Brian R Ohara
(74) *Attorney, Agent, or Firm* — Grossman, Tucker, Perreault & Pfleger, PLLC

(57) ABSTRACT

A battery bank for a redox flow battery having a cavity in which electrolyte is stored, wherein the electrolyte is provided for supply to one or more redox flow cells, wherein the cavity is a cavern.

20 Claims, 2 Drawing Sheets

CAVERN BATTERY BANK

FIELD

The present invention relates to a battery bank for a redox flow battery, to a redox flow battery having such a battery bank and to a method for producing a battery bank for a redox flow battery. The invention further relates to the use of a cavern, in particular a salt dome cavern, as a battery bank.

BACKGROUND

A redox flow battery, also known as a flow battery, is an electrochemical energy storage system. A redox flow battery is conventionally made up of a galvanic cell and two separate electrolyte circuits. The galvanic cell is divided into two half-cells by a membrane. Each half-cell is supplied by a separate electrolyte circuit, wherein the respective electrolyte is stored in tanks and pumped to the respective half-cell.

An anolyte is passed through a first half-cell and a catholyte through the second half-cell. An exchange of charge occurs between the electrolytes. During charging and discharging, the anolyte and catholyte are respectively reduced and oxidized to convert electrical energy into chemical energy and vice versa.

Such a redox flow battery is known for example from document DE 10 2012 016 317 A1.

The storage capacity of a redox flow battery is limited by the storage capacity of the tanks for storing the electrolytes. In known systems, a plurality of tank containers are interconnected to store electrolyte. Further containers serve to accommodate a membrane system which serves as a galvanic cell for input and output of energy. As the capacity of a redox flow battery increases in such systems, the number of containers required for storing the electrolytes therefore rises and thus so too does the complexity of the plant engineering.

SUMMARY

The object of the present invention is accordingly to provide a battery bank for a redox flow battery, a redox flow battery having such a battery bank and a method for producing a battery bank for a redox flow battery which do not exhibit the above-described disadvantages or at least exhibit them to a reduced extent and in particular simply and inexpensively provide a redox flow battery with a high storage capacity. A further object is to state a use for a cavern.

The above-described object is achieved by a battery bank for a redox flow battery, and the following description discloses advantageous developments of the invention.

Accommodating the electrolyte in a cavern means that even large volumes of electrolyte can be stored in a single storage location or single cavity. Caverns previously provided as gas caverns may, for example, be used for this purpose. No above-ground containers or tanks for storing electrolyte are therefore required. As a consequence, plant costs and complexity for storing electrolyte for large capacity redox flow batteries can be reduced, since there is no need for a widely branched pipework system for linking a plurality of tanks or containers together.

When a cavern is mentioned in the present document, it is taken to be an underground cavity which may for example be located several hundred meters below the earth's surface.

The electrolyte which is accommodated in the battery bank is for example a catholyte or an anolyte for a redox flow battery.

The electrolyte may have, for example, a storage capacity or energy density of 25 watt-hours per liter (W*h/l).

A further development of the battery bank provides that the cavern is a salt dome cavern. Such a salt dome cavern may have been produced in known manner by flushing or solution mining an underground salt stratum. Known methods can accordingly be used to create an underground cavity which serves as a battery bank for storing electrolyte for a redox flow battery. It is alternatively possible to use a pre-existing cavern, which was originally provided for gas storage, for storing electrolyte for a redox flow battery.

Alternative developments may provide that the cavern is bounded at least in places, in particular completely, by rocks, in particular granite.

A further development of the battery bank provides that the electrolyte comprises brine and polymer, in particular liquid polymer. In comparison with acid-based electrolytes, such an electrolyte has the advantage of greater environmental compatibility.

By using brine and polymer as electrolyte, it is possible to ensure that for example existing salt dome caverns, which were originally provided for storing gas, can be repurposed as a battery bank for a redox flow battery without additional environmental impact. Accordingly, a gas cavern which has already been flooded with brine can for example be connected to a circuit of a redox flow battery, wherein the brine can be combined with polymer during circulation. The brine can be enriched with polymer by above-ground addition of polymer to the brine. In this manner, large storage capacities can be utilized at comparatively low cost as battery banks for a redox flow battery.

When brine is mentioned in the present document, it is taken to mean a saturated aqueous saline solution.

A further development of the battery bank provides that the cavity has a volume (cavity volume) in an inclusive range from 70,000 $m^3$ (seventy thousand cubic meters) to 500,000 $m^3$ (five hundred thousand cubic meters) or 500,000 $m^3$ (five hundred thousand cubic meters) to 800,000 $m^3$ (eight hundred thousand cubic meters), in particular 600,000 $m^3$.

These volumes are of the orders of magnitude in which for example salt dome caverns for gas storage are conventionally produced. Large volumes of electrolyte can accordingly be stored in a single battery bank with low plant costs. For example, a cavern with a volume of approx. 600,000 $m^3$ (six hundred thousand cubic meters) can serve as a battery bank for storing electrolyte.

New salt dome caverns can be created as battery banks for a redox flow battery or existing gas storage salt dome caverns can be repurposed as battery banks for a redox flow battery. It goes without saying that, in addition to salt dome caverns, other types of caverns, such as for example granite caverns or the like, can be suitable for storing electrolyte for a redox flow battery.

Depending on the nature of the strata, it can be provided that the volume of a cavern which is to serve as a battery bank for a redox flow battery amounts to 100,000 $m^3$ (one hundred thousand cubic meters) to 1,000,000 million $m^3$ (one million cubic meters). Insofar as permitted by geological and technical constraints, the volume or the cavity volume of a cavern which is to serve as a battery bank for a redox flow battery is freely scalable, and can also hold in excess of one million cubic meters of electrolyte.

A further aspect of the invention relates to a redox flow battery having one or more redox flow cells and at least two battery banks for supplying one or more redox flow cells with electrolyte. At least one of the battery banks takes the form provided by the invention.

While the electrolyte, for example a catholyte, of at least one circuit of such a redox flow battery is stored underground in a cavern, the electrolyte, for example an anolyte, of a second circuit of the redox flow battery can be conventionally stored above ground in containers or tanks. Underground storage of even at least one electrolyte of a redox flow battery reduces the space required above ground and the plant engineering for interlinked above-ground tanks or containers.

When a redox flow cell is mentioned in the present document, it is taken to mean a galvanic cell which is divided into at least two half-cells by one or more membranes. An anolyte is passed through a first half-cell and a catholyte through the second half-cell. An exchange of charge occurs between the electrolytes. During charging and discharging, the anolyte and catholyte are respectively reduced and oxidized to convert electrical energy into chemical energy and vice versa.

A further development of the redox flow battery provides providing two or more battery banks for supplying the one or more redox flow cells with electrolyte, wherein at least two battery banks take the form provided by the invention. According to this development, at least two battery banks for storing electrolyte are arranged underground in caverns. In this manner, large storage volumes and capacities can be provided for a redox flow battery while keeping plant costs low. For example, a first battery bank according to the invention can store an anolyte and a second battery bank, separate from the first battery bank, can store a catholyte.

An alternative development of a redox flow battery provides that the redox flow battery is provided with precisely two battery banks for supplying the one or more redox flow cells with electrolyte, wherein the battery banks are constructed in the manner according to the invention. This development makes it straightforwardly possible to provide a redox flow battery which has a high storage volume or capacity, wherein plant engineering can be minimized because there are only two battery banks or electrolyte stores. For example, a plurality of redox flow cells can be fed and supplied with electrolyte from precisely two separate, underground caverns, wherein the first battery bank stores an anolyte and the second battery bank, separate from the first battery bank, stores a catholyte.

While the battery banks can be provided at least in part, preferably exclusively, underground in caverns, the one or more redox flow cells, which are also designated membrane stacks, are preferably arranged above ground.

A further development of the redox flow battery provides that a first pipe string and a second pipe string for supplying and withdrawing electrolyte open into the cavern, wherein the pipe strings are in particular nested in one another. Existing pipe strings, for example remaining from a previous use of the cavern for gas storage, can accordingly be reused or modified for supplying and/or withdrawing electrolyte.

To save space, the pipe strings can be nested in one another. For example, the first pipe string can be suspended in a second pipe string.

With regard to the plant engineering for a redox flow battery which may have a widely branched metallic pipework system, it is advantageous to use brine with polymer as the electrolyte since the metal pipes are not attacked by the brine.

When it is stated in the present document that the first and the second pipe strings open into the cavern, this means that at least one end of the respective pipe string extends into the cavity volume of the cavern which is provided for storing electrolyte.

A further development of the redox flow battery provides that one end of the first pipe string is associated with a cavern floor and one end of the second pipe string is associated with a cavern roof.

When the battery is in operation, stratification can arise in the electrolyte during battery charging or discharging. For example, during discharging, charged electrolyte may be arranged or concentrated in the region of the cavern roof above discharged electrolyte, while discharged electrolyte collects in the region of the cavern floor. During discharge, charged electrolyte can therefore be withdrawn via the second pipe string from the roof area of the cavern and discharged electrolyte can be returned to the cavern via the second pipe string in the region of the cavern floor.

The power output and power uptake capabilities of a redox flow cell depend on the one hand on the energy density and volume of the electrolyte and furthermore on the available membrane area within the redox flow cells via which charge exchange can proceed. Flexible adjustment of power uptake and power output of the redox flow battery can be achieved by providing a plurality of redox flow cells, wherein the redox flow cells can be arranged in a cascade system. The cascade system means the redox flow cells can be linked in in parallel or in series with one another or excluded from the energy flow in line with requirements in order to take account of current operating conditions with regard to energy storage or power output.

The redox flow battery can have a capacity in a range from 12.5 to 25 gigawatt hours (GWh) inclusive. Storage capacities which range up to the capacity of a nuclear power station can thus be achieved with the proposed redox flow battery.

The redox flow battery can serve as buffer storage for wind or solar energy power plants. It is advantageous here that a redox flow battery does not suffer any memory effect and is not damaged by deep discharge.

A further aspect of the invention relates to a method for producing a battery bank for a redox flow battery, wherein at least the following method steps are carried out:
provision of a cavity for storing electrolyte, wherein the cavity is a cavern;
provision of electrolyte in the cavern.

In the "provision of a cavity for storing electrolyte, wherein the cavity is a cavern" method step use may for example be made of pre-existing caverns which were originally provided for gas storage. Alternatively, a new cavern for storing electrolyte can be created using known methods, wherein for example a salt dome can be solution mined. The brine may here remain in the cavern and be combined with polymer.

Electrolyte can be introduced into the cavern after or during solution mining of the cavern. For example, salt dome caverns already flooded with brine can be gradually combined with polymer, in particular liquid polymer, in a circulating brine circuit in order to provide the electrolyte required for a redox flow battery.

Alternatively, a gas cavern can be directly filled or flooded with an electrolyte composed of brine and polymer and so be used as a battery bank for a redox flow battery.

A final aspect of the invention relates to the use of a cavern, in particular a salt dome cavern, as a battery bank for accommodating electrolyte for a redox flow battery. The cavern may in particular here be a salt dome cavern which was originally provided or used for gas storage.

BRIEF DESCRIPTION OF THE DRAWINGS

The invention is described in greater detail below on the basis of drawings which diagrammatically illustrate exemplary embodiments, in which.

DETAILED DESCRIPTION

Figure 1:
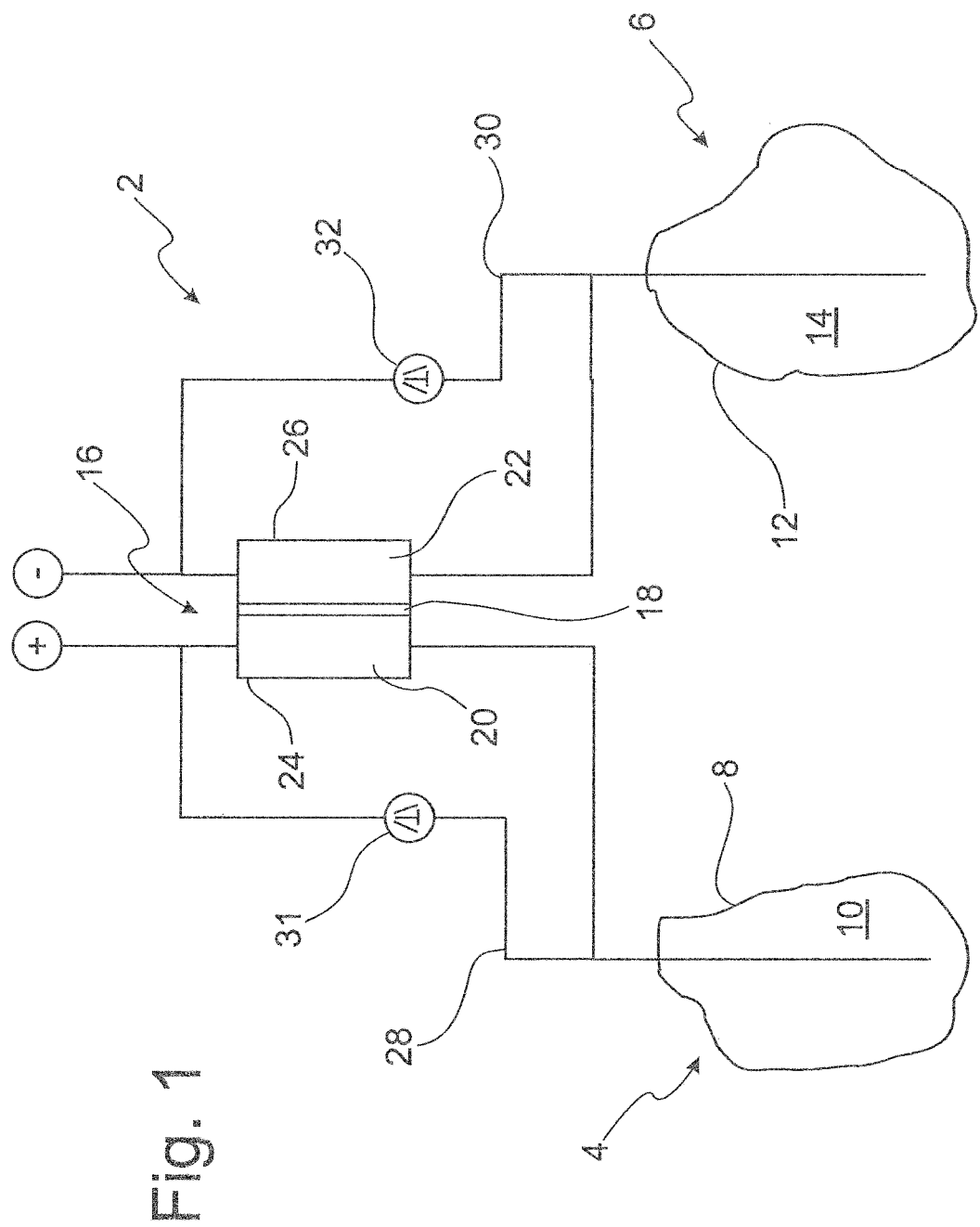
FIG. 1 shows a redox flow battery according to the invention with a battery bank according to the invention.

FIG. 1 shows a redox flow battery 2. The redox flow battery 2 has a first battery bank 4 and a second battery bank 6. The first battery bank 4 has a cavity 8 in which electrolyte 10 is stored. The cavity 8 is a cavern 8.

The second battery bank 6 has a cavity 12 in which electrolyte 14 is stored. The cavity 12 is a cavern 12.

The electrolyte 10 comprises brine and liquid polymer. The electrolyte 14 likewise comprises brine and liquid polymer. In the present case, electrolyte 10 forms the anolyte. Electrolyte 14 forms the catholyte.

The cavern 8 has a cavity volume for accommodating electrolyte 10 of 600,000 $m^3$. The cavern 12 has a cavity volume for accommodating electrolyte 14 of 600,000 $m^3$.

The redox flow battery 2 has a redox flow cell 16. The redox flow cell 16 is subdivided by a membrane 18 into a first half-cell 20 and a second half-cell 22. A first electrode 24 is associated with the first half-cell 20. A second electrode 26 is associated with the second half-cell 22. Electrical energy can be withdrawn from and supplied to the redox flow cell 16 via the electrodes 24, 26.

The first half-cell 20 is connected via pipework 28 to the first battery bank 4. The second half-cell 22 is connected via pipework 30 to the second battery bank 6. The electrolyte 10 is conveyed through the first half-cell 20 with the assistance of a pump 31. The electrolyte 12 is conveyed through the second half-cell 22 with the assistance of a pump 32. Two separate electrolyte circuits are formed in this manner.

The redox flow battery 2 may have a plurality of redox flow cells 16 which are interconnected in a cascade system. The present redox flow battery 2 has a capacity of 15 gigawatt hours (GWh).

Figure 2:
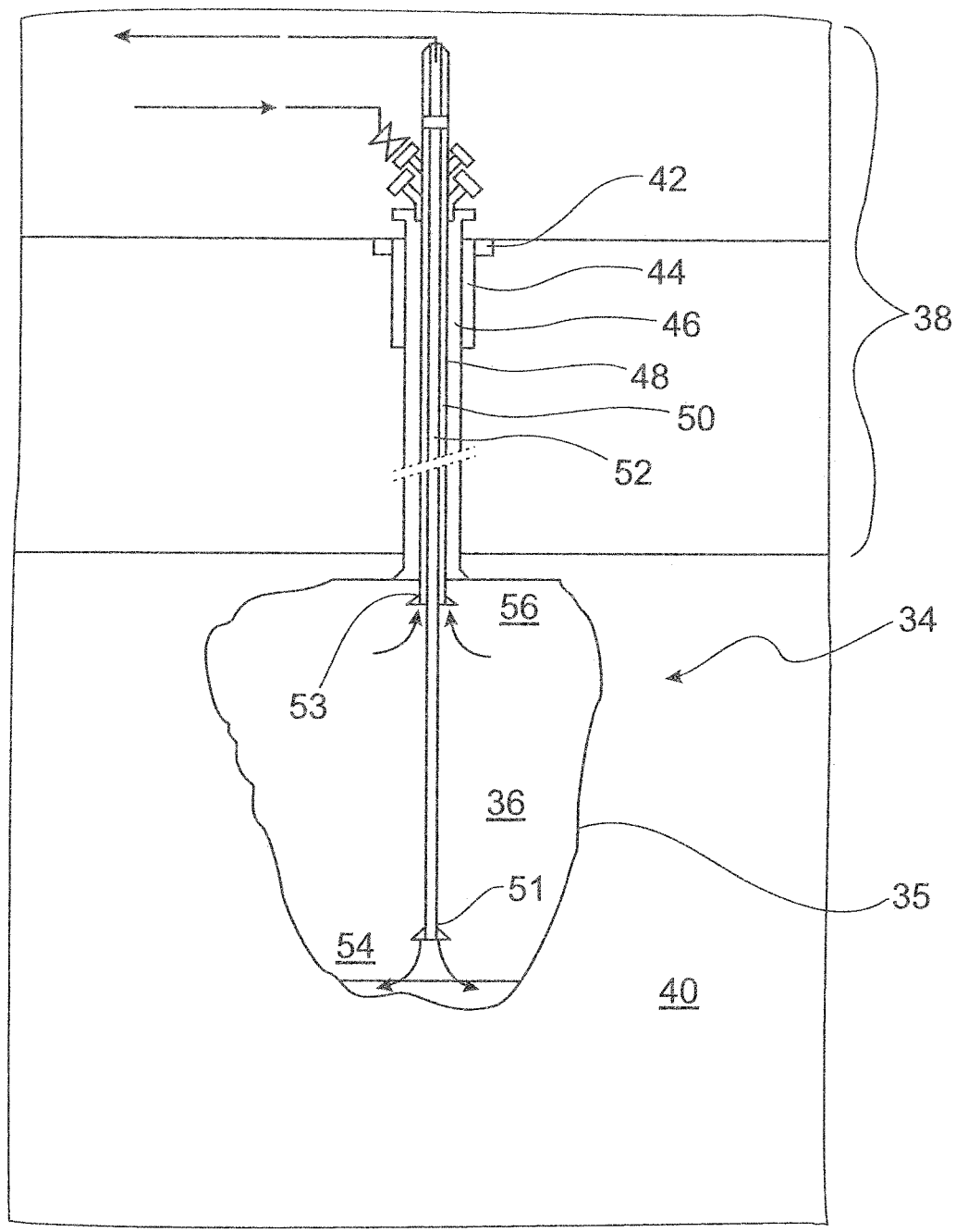
FIG. 2 shows a battery bank according to the invention for a redox flow battery.

FIG. 2 shows a battery bank 34 which can serve as a battery bank 4 or 6 of the redox flow battery 2 shown in FIG. 1. Battery bank 34 accommodates electrolyte 36. Electrolyte 36 can be withdrawn from or supplied to the battery bank 34 via a conveying system 38.

In the present case, the battery bank 34 has a salt dome cavern 35, which has been introduced into a salt dome 40 by solution mining, and a cavity 35 for accommodating electrolyte 36.

The conveying system 38 comprises a riser 42, an anchor pipe string 44, a lining pipe string 46, a protective run 48, an electrolyte withdrawal run 50 and an electrolyte return run 52.

The electrolyte return run 52 is a first pipe string 52 which opens into the salt dome cavern 35. A first end 51 of the first pipe string 52 is here associated with a cavern floor 54.

The electrolyte withdrawal run 50 is a second pipe string 50 which opens into the salt dome cavern 35. A first end 53 of the second pipe string 50 is here associated with a cavern roof 56.

During discharge of a redox flow battery, which can for example be designed as a redox flow battery 2 according to FIG. 1, charged electrolyte 36 is withdrawn from the region of the cavern roof 56 via the second pipe string 50 and supplied to one or more redox flow cells.

Discharged electrolyte 36 can be returned via the first pipe string 52 to the cavern floor 54 of the salt dome cavern 35, once the chemical energy of the electrolyte 36 has been converted into electrical energy in one or more redox flow cells. This thus gives rise to stratification within the salt dome cavern 35, wherein charged electrolyte 36 is associated with or concentrated at the cavern roof 56 and discharged electrolyte 36 is associated with or concentrated at the cavern floor 54.

The pumps 31, 32 can be operated in two directions, such that the electrolyte circuits can also be operated in two directions. In this case, the second pipe string 50 is an electrolyte return run and the first pipe string 52 the electrolyte withdrawal run. The pumps 31, 32 can be arranged within or outside the cavities 8, 10.

In the present case, a salt dome cavern 35 is therefore used as a battery bank 34, by an electrolyte 36, which is provided for supply to a redox flow battery, being stored in the salt dome cavern 35.

The battery bank 34 can on the one hand be produced by repurposing a pre-existing gas cavern, which has been created in a salt dome by solution mining, into a battery bank for storing electrolyte. The battery bank 34 may for example be an already flooded, brine-filled gas cavern. Polymer can then gradually be supplied to the brine in a cycle process in order to provide an electrolyte for a redox flow battery in the cavern.

Alternatively, a cavern can be incorporated into a salt dome specifically for use as a battery bank for a redox flow battery.

REFERENCE SIGNS

2 Redox flow battery
4 First battery bank
6 Second battery bank
8 Cavity/cavern
10 Electrolyte/anolyte
12 Cavity/cavern
14 Electrolyte/catholyte
16 Redox flow cell
18 Membrane
20 First half-cell
22 Second half-cell
24 First electrode
26 Second electrode
28 Pipework
30 Pipework
31 Pump
32 Pump
34 Battery bank
35 Salt dome cavern/cavity
36 Electrolyte
38 Conveying system
40 Salt dome
42 Riser
44 Anchor pipe string
46 Lining pipe string 48 Protective run
50 Electrolyte withdrawal run/second pipe string
51 First end of the first pipe string
52 Electrolyte return run/first pipe string
53 First end of the second pipe string
54 Cavern floor
56 Cavern roof

What is claimed is:

1. A battery bank for a redox flow battery, comprising:
a cavity in which electrolyte is stored, wherein the electrolyte is provided for supply to one or more redox flow cells, wherein the cavity is a salt dome cavern.

2. The battery bank as claimed in claim 1, wherein the electrolyte comprises brine and polymer.

3. The battery bank as claimed in claim 1, wherein the cavity has a volume in an inclusive range from 70,000 m³ to 500,000 m³, or 500,000 m³ to 800,000 m³.

4. A redox flow battery comprising:
one or more redox flow cells; and
at least two battery banks for supplying the one or more redox flow cells with electrolyte, wherein at least one of the at least two battery banks comprises a cavity in which the electrolyte is stored, wherein the cavity is a salt dome cavern.

5. The redox flow battery as claimed in claim 4, wherein at least two of the at least two battery banks each comprises a cavity in which a respective electrolyte is stored, wherein each cavity is a salt dome cavern.

6. The redox flow battery as claimed in claim 4, wherein a first pipe string and a second pipe string for supplying and withdrawing electrolyte open into the salt dome cavern, wherein the first and the second pipe strings are nested in one another, wherein one end of the first pipe string is associated with a cavern floor of the salt dome cavern and one end of the second pipe string is associated with a cavern roof of the salt dome cavern.

7. The redox flow battery as claimed in claim 4, wherein
a plurality of redox flow cells are provided, wherein the redox flow cells are arranged in a cascade system,
and/or
the redox flow battery has a capacity in an inclusive range from 12.5 to 25 gigawatt hours (GWh).

8. A method for producing at least one battery bank for a redox flow battery, comprising:
disposing a first electrolyte in a first cavity for storing electrolyte, wherein the first cavity is a first salt dome cavern.

9. Use of a cavern as a battery bank for accommodating electrolyte for a redox flow battery, wherein the cavern is a salt dome cavern.

10. The battery bank as claimed in claim 2, wherein the polymer is a liquid polymer.

11. The redox flow battery as claimed in claim 4, wherein the at least two battery banks for supplying the one or more redox flow cells with electrolyte consists of two battery banks for supplying the one or more redox flow cells with electrolyte, wherein the two battery banks each comprise a cavity in which a respective electrolyte is stored, wherein each cavity is a salt dome cavern.

12. The battery bank as claimed in claim 1, wherein the cavity has a volume in an inclusive range from 100,000 m³ to 1,000,000 m³.

13. The battery as claimed in claim 4, wherein the cavity has a volume in an inclusive range from 100,000 m³ to 1,000,000 m³.

14. The battery as claimed in claim 4, wherein the electrolyte comprises brine and polymer.

15. The method as claimed in claim 8, wherein the first cavity has a volume in an inclusive range from 100,000 m³ to 1,000,000 m³.

16. The method as claimed in claim 8, wherein the first electrolyte comprises brine and polymer.

17. The method as claimed in claim 8, further comprising:
disposing a second electrolyte in a second cavity for storing electrolyte, wherein the second cavity is a second salt dome cavern.

18. The method as claimed in claim 17, wherein the second cavity has a volume in an inclusive range from 100,000 m³ to 1,000,000 m³ and/or the second electrolyte comprises brine and polymer.

19. The use of a cavern as claimed in claim 9, wherein the cavern has a volume in an inclusive range from 100,000 m³ to 1,000,000 m³.

20. The use of a cavern as claimed in claim 9, wherein the electrolyte comprises brine and polymer.

* * * * *